SOLID SMOOTH-SURFACE ARTICLE WASHING DEVICE

Original Filed March 27, 1968 3 Sheets-Sheet 1

INVENTOR
C. AMORY HULL

BY Carlton K. Fitchett
AGENT

SOLID SMOOTH-SURFACE ARTICLE WASHING DEVICE

Original Filed March 27, 1968 3 Sheets-Sheet 2

INVENTOR
C. AMORY HULL

BY Carlton B. Fitchett
AGENT

SOLID SMOOTH-SURFACE ARTICLE WASHING DEVICE

Original Filed March 27, 1968 3 Sheets-Sheet 3

INVENTOR
C. AMORY HULL
BY Carlton B. Fitchett
AGENT

United States Patent Office

Re. 28,135
Reissued Aug. 27, 1974

28,135
SOLID SMOOTH-SURFACE ARTICLE WASHING DEVICE

Charles Amory Hull, Daytona Beach, Fla.
(58 Brook Drive, Ormond Beach, Fla. 32074)

Original No. 3,514,329, dated May 26, 1970, Ser. No. 716,549, Mar. 27, 1968. Application for reissue May 22, 1972, Ser. No. 255,870
Int. Cl. B08b *3/00*
U.S. Cl. 134—58 D 7 Claims

Matter enclosed in heavy brackets [ ] appears in the original patent but forms no part of this reissue specification; matter printed in italics indicates the additions made by reissue.

ABSTRACT OF THE DISCLOSURE

A solid smooth-surface article washing device comprising a flat top wash fluid reservoir with two inverted frusto-conical casings mounted one inside the other on the top surface of the reservoir. A wash fluid impeller is arranged within the reservoir with the body thereof substantially below the liquid level of the wash fluid therein and in vertical alignment with the relatively narrow end of the inner casing. The article to be washed is suspended above the relatively wide end of the inner casing. When activated, the impeller moves the wash fluid upwardly within the inner casing in a spiraling rotary pattern to flow outwardly over the surface of the article being washed. On leaving the peripheral edge of the article being washed, the fluid continues to move outwardly until it contacts the inner side wall of the outer casing whereupon it drains back into the fluid reservoir through a chamber formed between the casings.

BACKGROUND OF THE INVENTION

This invention relates to solid smooth-surface article washing devices and more particularly to a dish washer adapted to wash dishes one at a time.

In conventional dish washers, a relatively large area is provided for stacking a large number of dishes and other items incident to the serving of meals. In some dish washers, means are provided for rotating the stacked dishes, etc., past a plurality of spray nozzles. In other dish washer arrangements, the nozzle array is rotated past the stacked dishes. In order to assure a satisfactory washing of the stacked articles when using either of the above arrangements, it has been found necessary to utilize relatively prolonged increments of time for the wash and rinse cycles. More recently, relatively small versions of the conventional type of dish washers specially designed to accommodate only a few dishes have been made available on the open market but these dish washers still require a stacking of the articles to be washed with the above-noted disadvantage of prolonged timing cycles.

These disadvantages are overcome by the device disclosed by the present invention wherein the dishes are washed one at a time. The invention, while seemingly quite simple, nevertheless affords an important advance in the art of dish washers in that it provides a device adapted for the daily needs of a small family and/or for those persons whose daily living routine results in a need for a dish washer at somewhat infrequent intervals.

SUMMARY OF THE INVENTION

The dish washer herein disclosed contemplates the individual washing of each soiled item of tableware. An advantage of such a concept is that the dish washing device can be of extremely small over-all size and the operating parts thereof can be arranged for the very best and efficient cleaning of the individual items of tableware. In addition, the amounts of heated wash fluids and rinsing fluids utilized in the operation of the device are greatly reduced as well as keeping the time of each cycle of the washing operation at a minimum. A further advantage is that an opportunity is provided to inspect each washed article for cleanliness when it is removed from the device at the conclusion of each individual washing operation.

The primary object of the invention is to provide a dishwasher wherein the advantages noted above are inherent from its mode of operation. Other objects, features and advantages will be apparent from the hereinafter detailed description.

According to this invention, each article to be washed is placed in the device above and in vertical alignment with an impeller which, when activated, impells the wash fluid spiraling upwardly with a rotating pattern against a surface of the article to be washed. On contacting the surface to be washed, the rotating pattern of the wash fluid continues and causes the same to leave the peripheral edge of the article and impinge on the inside wall of a casing forming part of the overall enclosure of the device. The wash fluid then flows downwardly and returns to the wash fluid reservoir through a peripheral chamber adjacent the inside wall of the casing. When the impeller is deactivated, clean rinse water is directed against the article being washed through a pair of spray nozzles, one arranged above and another below the article.

BRIEF DESCRIPTION OF THE DRAWING

The novel features which are considered as characteristic for the invention are set forth in particular in the appended claims. The invention itself, however, both as to its construction and method of operation, will be best understood from the following description of a preferred embodiment when read in connection with the accompanying drawings.

DESCRIPTION OF THE PREFERRED EMBODIMENT

Figure 1:
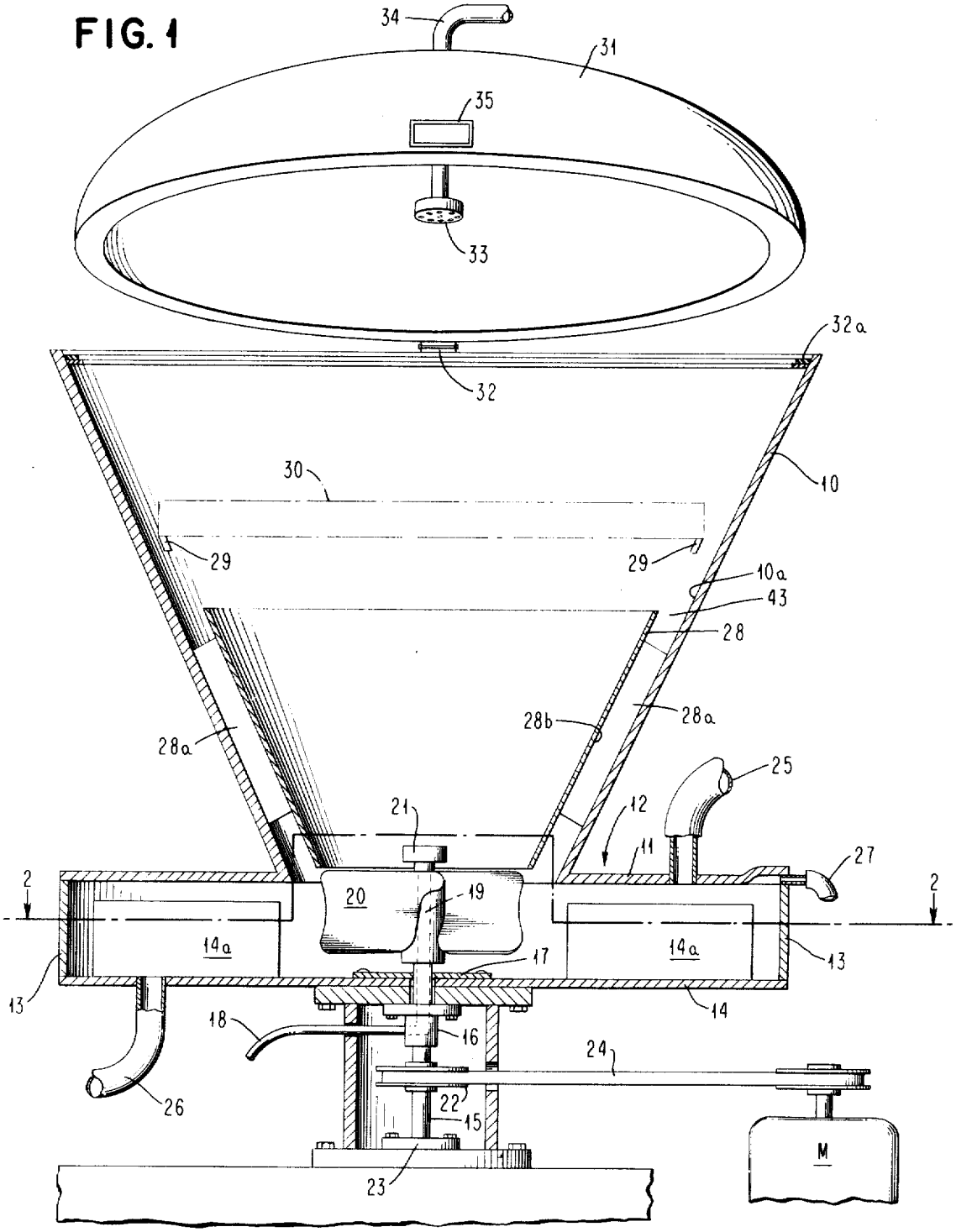
FIG. 1 is a side elevation view of a dish washing device according to the invention.
Figure 2:
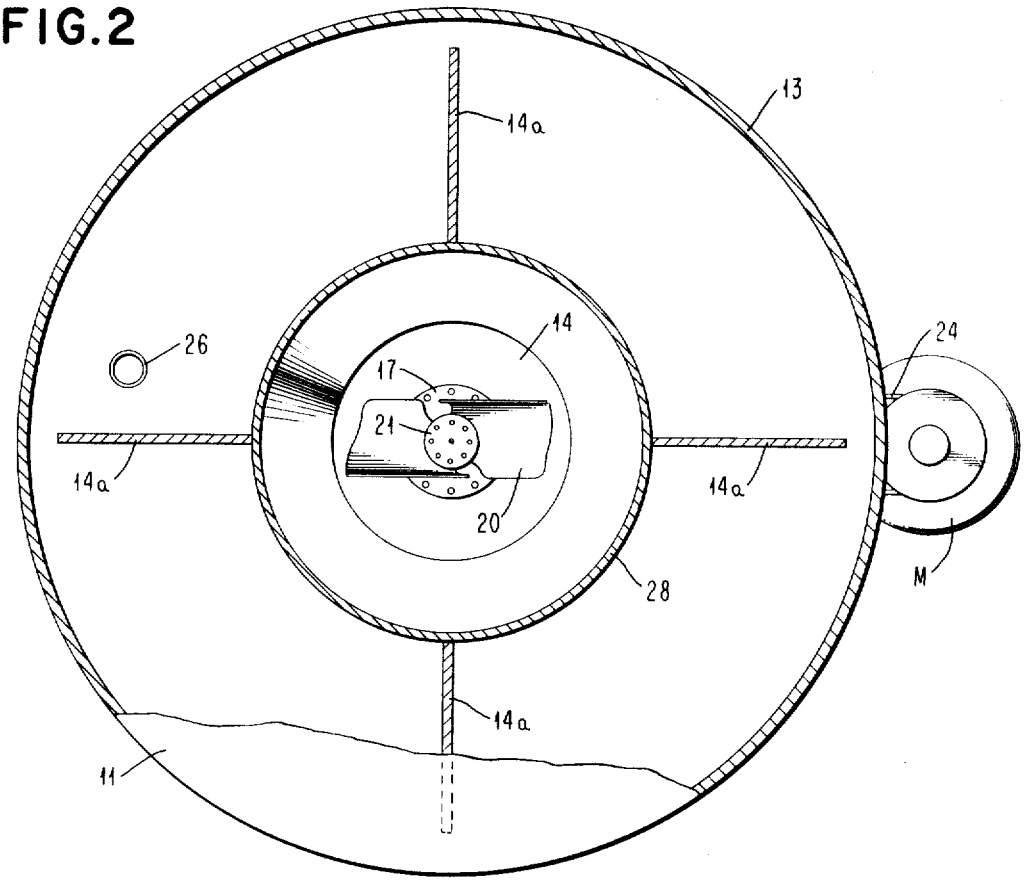
FIG. 2 is a top elevation view, partly in section, taken along the line 2—2 of FIG. 1.
Figure 3:
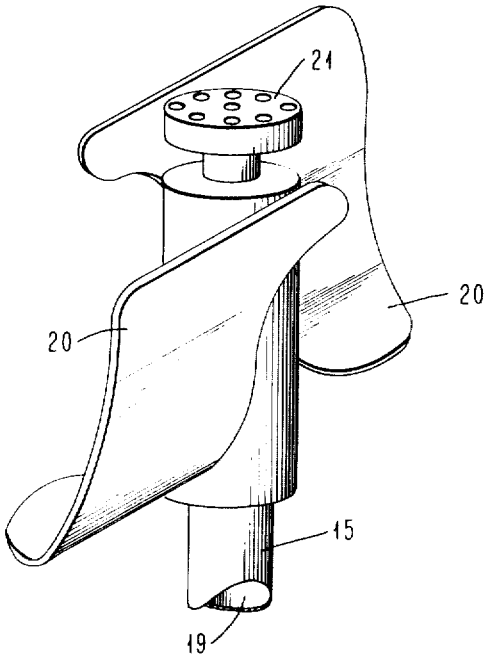
FIG. 3 is a side view in perspective showing a preferred form of the impeller together with a spray nozzle mounted thereabove on the upper end of the impeller drive shaft.

Referring now more particularly to the drawings wherein like numerals designate like parts throughout the various views, the numeral 10 indicates the major portion of the over-all enclosure for the device. Specifically, it may be described as a casing which is inverted and elongated frusto-conical in shape. The casing 10 is secured by suitable means to and extends above the top cover 11 of a wash fluid supply reservoir 12 having a peripheral side wall 13 and a base plate 14. Wings 14a affixed to the base plate 14 serve to prevent excessive swirling of wash fluid within the reservoir when the impeller 20 is activated.

At the center of the base of the reservoir 12, a rotatable shaft 15 is journaled at 16 and extends into the reservoir. Sealing means are provided at 17 to prevent eakage of fluid from the reservoir. The journal 16 includes a further sealing means (not shown) whereby inse liquid conduit 18 is placed in throughflow connection with the central hollow portion 19 of shaft 15. An mpeller 20 is secured on that part of shaft 15 within he reservoir 12. A form of impeller particularly adapted 'or the needs of this invention is shown in detail in FIG. 1. The upper end portion of shaft 15 above the impeller 20 serves as a mounting means for a spray nozzle 21 which, in turn, receives rinse fluid through conduit 18 and he hollow portion 19 of shaft 15. The lower end of shaft 15 below the journal 16 is equipped with a drive pulley 22 and a further bearing means 23. A motor M, together with a belt 24, serves as the driving means for shaft 15.

Figure 4:
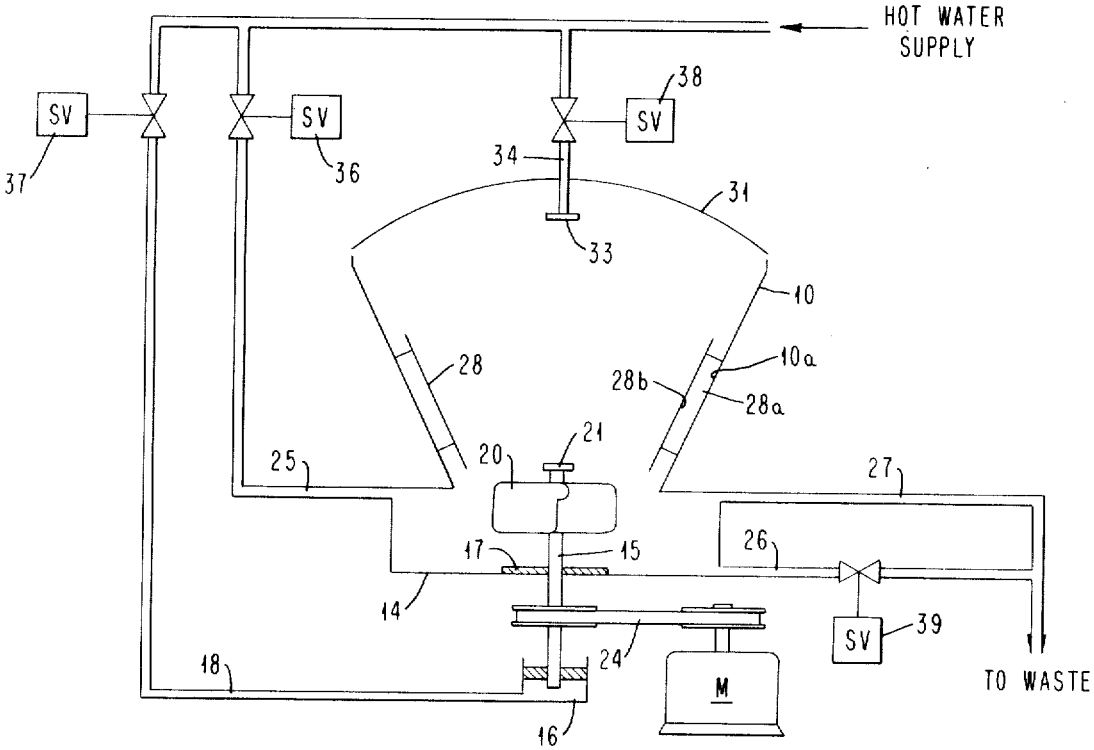
FIG. 4 is a mechanical schematic view showing the fluid supply passages to various elements of the device and the arrangement in these passages of solenoid operated valves for controlling liquid flow therethrough.
Figure 5:
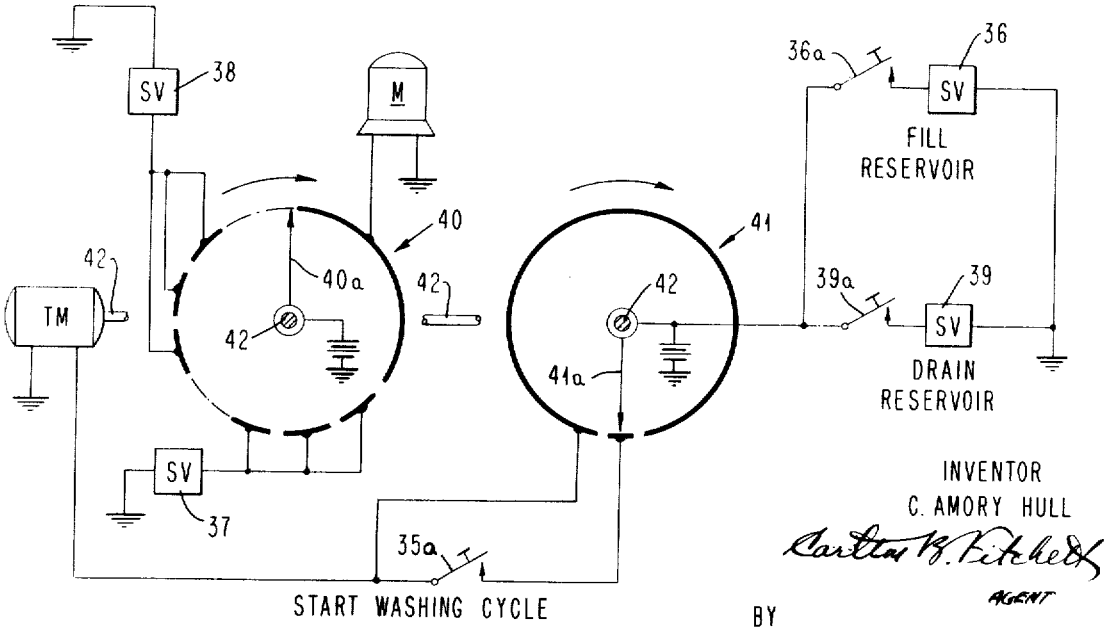
FIG. 5 is an electrical schematic view of the timing device for the sequential operation and control of the various parts of the device according to this invention.

The wash liquid reservoir 12 is provided with three conduit connections 25, 26 and 27 which are for the purpose of supplying liquid to the reservoir, to drain liquid from the reservoir, and a liquid level overflow, respectively. The supply and drain conduits 25 and 26, respectively, as well as the conduit 18, are equipped with suitable valves in order to open or close the conduits as the need may be during the operation of the device. These valves are indicated in FIGS. 4 and 5, and their operation will be explained in detail hereinafter.

Arranged within the casing 10 and supported in spaced apart relation thereto is a second similarly shaped casing 28 of less overall vertical length than the casing 10. The casing 28 is supported in the position shown by a plurality of radially extending wings 28a and both casings are so arranged above the reservoir 12 that the relatively narrow end openings of the casings are in substantial horizontal alignment, and with the centers of the said openings directly above and in line with the centerline of shaft 15. Further, the upper edges of the wings of impeller 20 and the lower edge of casing 28 are closely adjacent, and the nozzle 21 is within the lower portion of casing 28. The above described relationship between these parts is clearly shown in FIG. 1. A peripheral chamber 43 is formed between the side wall 10a of casing 10 and the sidewall 28b of casing 28.

The inner surface of casing 10 above the relatively wide upper end opening of casing 28 may be provided with a plurality of lugs 29 adapted to support a wire mesh or otherwise substantially *perforate* [imperforate] tray 30 (shown in phantom since the exact form and shape thereof may vary in many ways) into which a solid smooth-surface article to be washed may be placed. The upper edge of the relatively wide portion of casing 10 is fitted with a dome-shape cover 31, the same being moveably secured thereto through a hinge means 32. A sealing ring 32a is arranged between the bottom edge of the cover and the upper edge of the casing 10 to insure a fluid tight joint therebetween. The under side of the cover at its center is fitted with a downwardly directed spray nozzle 33 and a throughflow passage thereto is provided through the cover to a conduit 34. A suitable valve to open or close conduit 34 is provided and its proper sequence of operation is shown in FIGS. 4 and 5. Such operation will be explained hereinafter. The cover 31 is also provided with a latch means 35 which may also include, in the preferred embodiment, an electrical switch means 35a through which the sequential timing of the various cycles incident to the device according to this invention is instigated in a manner to be fully explained hereinafter in connection with FIGS. 4 and 5.

The mode of operation of the device will now be described with reference being made particularly to FIGS. 4 and 5 which show a mechanical schematic representation of the subject invention, and an electrical schematic representation of an arrangement for controlling the preferred sequence of operations of the device, respectively.

As will be seen from FIG. 5, the timing motor TM is at rest and all circuits to the associated and controlled equipment, motor M, solenoid valve 37, and solenoid valve 38, are open. When it is desired to wash a hard smooth-surface article in this device, solenoid valve 36 is activated by closing switch 36a thereby opening conduit 25 to permit hot water to flow into the reservoir 12. When an overflow is noted from open conduit 27, the switch 36a is released and solenoid valve 36 once more closes conduit 25.

A suitable amount of detergent is then added manually to the fluid now in reservoir 12 to make up the wash fluid recited in the appended claims. Next, an article to be washed is placed in the tray 30 (FIG. 1) and the cover 31 is closed and latched. The latching of the cover momentarily closes switch 35a, included as part of the cover latch as mentioned above, and starts the running of motor TM for driving the timing switch schematically represented in FIG. 5 by the segmented rings 40 and 41 and the contact arms 40a and 41a associated therewith.

As soon as the timing motor TM begins to run, continuing power for a full revolution of shaft 42 driven thereby is provided through the arm 41a and the ring 41 associated therewith. At the same time, the switch arm 40a moves into contact with the relatively long section of ring 40 associated therewith and closes a circuit to activate the motor M which drives the impeller 20. Thus, the wash fluid is impelled upwardly within the casing 28 and returns to the reservoir in the manner previously described. As the arm 40a moves off the long section of ring 40, the impeller driving motor M is deactivated, and as the arm continues its movement, it consecutively contacts a plurality of short segments of ring 40 thereby activating solenoid valve 37 to consecutively open and close the conduit 18 leading to the now stationary nozzle 21 a plurality of times, three being illustrated. Each time the conduit 18 is opened, a flow of clean rinse water from the hot water source is directed by the nozzle 21 against the adjacent surface of the article in tray 30. After the switch arm 40a moves from the last of the segments of ring 40 connected to the solenoid valve 37, it next consecutively contacts an additional plurality of short segments of the ring 40 connected to solenoid valve 38, each of which consecutively opens and closes conduit 34 leading to nozzle 33 depending from the inside of cover 31. Each time the conduit 34 is opened, a flow of clean rinse water from the hot water supply is directed by the nozzle 33 against the side of the article in tray 30 adjacent to that nozzle. After leaving the last of the segments of ring 40 connected to solenoid valve 38, the arm 40a continues its movement until just before it reaches the above-mentioned relatively long section of the ring 40. Movement of the shaft 42 driving the arm 40a is stopped at this time by the arm 41a running off the continuous part of ring 41 thus stopping the running of the timing motor TM.

When the device shuts down as described above, the cover is opened and the washed article removed from tray 30 and may be inspected for cleanliness. When another article is placed in the tray and the cover 31 once more closed and latched, the washing and rinsing steps set forth above are repeated by the associated reactivation of the timing motor TM. The wash fluid may be drained from the reservoir 12 at the conclusion of any individual article washing cycle by closing switch 39a which energizes solenoid valve 39 to open conduit 26 whereupon the wash fluid in reservoir 12 passes to the waste connection.

It is to be noted that the described and illustrated arrangement of the casing parts 10 and 28 forms a peripheral hollow chamber 43, the lower relatively narrow end thereof being in substantially horizontal alignment with the lower narrow end of each of the respective casings and, accordingly, communicating with the wash fluid reservoir; that any well known practice, either by mechanical automation or manual act, for adding a detergent to any household hot tap water and thereby obtain a suitable wash fluid is included in the reference to a wash fluid supply as that term is used herein; and that any household hot water tap will suffice as a suitable source of a rinse fluid as that term is used herein.

What is claimed as new and desired to be protected by Letters Patent is set forth in the appended claims. I claim:

1. A solid smooth-surface article washing device comprising a wash fluid supply reservoir, a first inverted and elongated substantially frusto-conical casing having an inner side wall, the casing being affixed to the wash fluid supply reservoir with its relatively narrow end opening into said reservoir, a second inverted but less elongated substantially frusto-conical casing having an outer side wall, said second casing being arranged within and spaced apart from said first casing and forming therewith a peripheral chamber between the said inner and outer side walls of the casings, the relatively narrow end of the chamber communicating with said reservoir, means for supplying wash fluid to the reservoir, a substantially *perforate* [imperforate] tray adapted to support therein an article to be washed, the tray being arranged within the upper relatively wide portion of the first casing and above the upper wide end portion of the second casing, means for supporting said tray above the upper wide end portion of the second casing, an impeller, including a drive shaft to which it is affixed, adapted for rotation and mounted within said reservoir in axial alignment with the said narrow end opening of said second casing, the diameter of said impeller being less than the inner diameter of said peripheral chamber at its point of communication with said reservoir, a rinse fluid supply means, a first and a second spray nozzle arranged within said casings for dispensing rinse fluid to and against opposite surfaces of an article supported in said tray, and means for rotating the impeller drive shaft whereby wash fluid from within the reservoir is impelled by the impeller upwardly within the second casing in a substantially spiraling and rotating pattern to and against an adjacent surface of an article supported in said tray.

2. An article washing device according to claim 1, in which the wash fluid on impinging with said spiraling and rotating pattern against the surface of an article supported in said tray, continues its rotating pattern outwardly along said surface to the periphery thereof and, on leaving the periphery, strikes against the said inside wall of said first casing and thereafter flows downwardly through the said peripheral chamber into the said wash fluid supply reservoir.

3. An article washing device according to claim 1, in which said first spray nozzle is directed upwardly and arranged on the impeller shaft above the impeller, and including also a rinse fluid conducting means within said impeller drive shaft whereby rinse fluid is conducted from the rinse fluid supply means to and through said first nozzle against one surface of an article supported in said tray.

4. An article washing device according to claim 1, including also a cover moveably supported on the upper relatively wide end portion of said first casing and having a latch means for securing the same thereto, the second spray nozzle being supported from the underside of said cover at the center thereof and directed downwardly, and a rinse fluid conducting means carried by the cover whereby rinse fluid is conducted from the rinse fluid supply means to and through said second nozzle against another surface of an article supported in said tray.

5. An article washing device according to claim 4, in which the cover, the wall of the first casing, and the walls of the wash fluid reservoir, together form a total enclosure for the device.

6. An article washing device according to claim 4, including also an automatic timing means for individually actuating in sequence (a) the rotation of the wash fluid impeller, (b) the dispensing of rinse fluid through said first spray nozzle, and (c) the dispensing of rinse fluid through said second spray nozzle, said automatic timing means being activated by means operable upon the closing and latching of the said cover.

7. An article washing device according to claim 1, in which the rotation of the impeller and the dispensing of rinse fluid through the said first and second spray nozzles are individually activated in sequence.

References Cited

The following references, cited by the Examiner, are of record in the patented file of this patent or the original patent.

UNITED STATES PATENTS

| | | | |
|---|---|---|---|
| 1,624,381 | 4/1927 | Barker | 134—99 |
| 2,030,092 | 2/1936 | Benson | 134—186 X |
| 3,285,779 | 11/1966 | Dunham | 134—99 X |

FOREIGN PATENTS

| | | | |
|---|---|---|---|
| 355,266 | 10/1961 | Switzerland | 134—580 |

ROBERT L. BLEUTGE, Primary Examiner

U.S. Cl. X.R.

134—95, 99, 177, 182, 200